United States Patent
Yamamoto

(10) Patent No.: US 11,047,704 B2
(45) Date of Patent: *Jun. 29, 2021

(54) SYSTEM FOR PROVIDING A NOTIFICATION OF A PRESENCE OF AN OCCUPANT IN A VEHICLE THROUGH HISTORICAL PATTERNS AND METHOD THEREOF

(71) Applicant: HONDA MOTOR CO., LTD., Tokyo (JP)

(72) Inventor: Stuart Masakazu Yamamoto, La Mirada, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 16/373,436

(22) Filed: Apr. 2, 2019

(65) Prior Publication Data
US 2019/0226865 A1  Jul. 25, 2019

Related U.S. Application Data

(63) Continuation of application No. 15/397,101, filed on Jan. 3, 2017, now Pat. No. 10,274,335.

(51) Int. Cl.
*G01C 21/36* (2006.01)
*B60N 2/00* (2006.01)
*G06K 9/00* (2006.01)

(52) U.S. Cl.
CPC ......... *G01C 21/3641* (2013.01); *B60N 2/002* (2013.01); *G01C 21/3617* (2013.01); *G01C 21/3697* (2013.01); *G06K 9/00838* (2013.01)

(58) Field of Classification Search
CPC .......... G08B 21/22; B60N 2/002; B60N 2/26; B60R 2300/8013; G01C 21/3697
See application file for complete search history.

(56) References Cited

U.S. PATENT DOCUMENTS 6,922,147 B1  7/2005  Viksnins et al.
9,971,348 B1  5/2018  Canavor et al.
(Continued)

FOREIGN PATENT DOCUMENTS

CN  102288193 A  12/2011
DE  10295465 B4  3/2012
(Continued)

OTHER PUBLICATIONS

Functional Assessment of Unattended Child Reminder Systems, NHTSA (Year: 2015), (76 Pages total).
(Continued)

*Primary Examiner* — Ryan Rink
(74) *Attorney, Agent, or Firm* — Arent Fox LLP

(57) ABSTRACT

The systems and methods disclosed herein are directed to providing a notification of a presence of an occupant in a vehicle before arriving at a destination. In an illustrative embodiment, the vehicle may include a location system for tracking routes taken or traveled by the vehicle. The vehicle may include a detection system for determining whether the occupant is in the vehicle along those routes traveled by the vehicle. The vehicle may also include a notification system. The notification system may store the routes traveled by the vehicle with and without the occupant in the vehicle. The notification system may provide a notification when a route is taken with the occupant and the route is not associated with the occupant based on the historical patterns of the routes traveled by vehicle with and without the occupant.

20 Claims, 11 Drawing Sheets

(56) References Cited

U.S. PATENT DOCUMENTS

| | | |
|---|---|---|
| 9,975,380 B1 | 5/2018 | Voss et al. |
| 2008/0048887 A1 | 2/2008 | Aoki et al. |
| 2010/0201505 A1 | 8/2010 | Honary et al. |
| 2011/0068954 A1 | 3/2011 | McQuade et al. |
| 2016/0150362 A1 | 5/2016 | Shaprio et al. |
| 2016/0176409 A1 | 6/2016 | Kirsch et al. |
| 2017/0140634 A1 | 5/2017 | Mindel et al. |
| 2017/0166121 A1 | 6/2017 | Biondo et al. |
| 2017/0213155 A1 | 7/2017 | Stauffer et al. |
| 2018/0075721 A1 | 3/2018 | Oliver et al. |
| 2018/0108242 A1 | 4/2018 | Wilkinson et al. |
| 2018/0138945 A1 | 5/2018 | Kearney et al. |
| 2018/0219759 A1 | 8/2018 | Brown et al. |

FOREIGN PATENT DOCUMENTS

| | | |
|---|---|---|
| GB | 2528075 A | 1/2016 |
| JP | 2007-10634 A | 1/2007 |

OTHER PUBLICATIONS

Search Report dated Dec. 3, 2018, issued by the German Patent Office in counterpart German Application No. 10 2017 223 846.1.

| | | | |
|---|---|---|---|
| 1602 | ROUTE 1 / ROUTE 2 | DRIVER: B<br>CHILD IN REAR SEAT: YES<br>TIME 8:50 AM<br>ROUTE 2 | ROUTE 2 TAKEN<br>WITH CHILD |
| 1604 | ROUTE 1 / ROUTE 2 | DRIVER: B<br>CHILD IN REAR SEAT: NO<br>TIME 9:10 AM<br>ROUTE 1 | ROUTE 1 TAKEN<br>WITHOUT CHILD |
| 1606 | ROUTE 1 / ROUTE 2 | DRIVER: B<br>CHILD IN REAR SEAT: YES<br>TIME 8:46 AM<br>ROUTE 2 | ROUTE 2 TAKEN<br>WITH CHILD |
| 1608 | ROUTE 1 / ROUTE 2 | DRIVER: B<br>CHILD IN REAR SEAT: YES<br>TIME 8:57 AM | PREDICTION: ROUTE 2<br>SHOULD BE TAKEN,<br>PROVIDE NOTIFICATION<br>IF PASS CROSSROAD |

FIG. 16

| | | | |
|---|---|---|---|
| 1702 | ROUTE 9<br>ROUTE 10<br>ROUTE 11 | DRIVER: C<br>PASSENGER: D<br>CHILD IN REAR SEAT: YES<br>TIME 8:15 AM<br>ROUTE 9 | ROUTE 9 TAKEN<br>WITH CHILD<br>FOR DRIVER C |
| 1704 | ROUTE 9<br>ROUTE 10<br>ROUTE 11 | DRIVER: C<br>PASSENGER: D<br>CHILD IN REAR SEAT: YES<br>TIME 8:10 AM<br>ROUTE 9 | ROUTE 9 TAKEN<br>WITH CHILD<br>FOR DRIVER C |
| 1706 | ROUTE 9<br>ROUTE 10<br>ROUTE 11 | DRIVER: D<br>PASSENGER: C<br>CHILD IN REAR SEAT: YES<br>TIME 8:16 AM<br>ROUTE 10 | ROUTE 10 TAKEN<br>WITH CHILD<br>FOR DRIVER D |
| 1708 | ROUTE 9<br>ROUTE 10<br>ROUTE 11 | DRIVER: D<br>PASSENGER: C<br>CHILD IN REAR SEAT: NO<br>TIME 8:20 AM<br>ROUTE 11 | ROUTE 11 TAKEN<br>WITHOUT CHILD<br>FOR DRIVER C |
| 1710 | ROUTE 9<br>ROUTE 10<br>ROUTE 11 | DRIVER: D<br>PASSENGER: C<br>CHILD IN REAR SEAT: NO<br>TIME 8:21 AM<br>ROUTE 11 | ROUTE 11 TAKEN<br>WITHOUT CHILD<br>FOR DRIVER D |
| 1712 | ROUTE 9<br>ROUTE 10<br>ROUTE 11 | DRIVER: C<br>PASSENGER: D<br>CHILD IN REAR SEAT: YES<br>TIME 8:00 AM | PREDICTION: ROUTE 9<br>SHOULD BE TAKEN,<br>PROVIDE NOTIFICATION<br>IF PASS CROSSROAD |
| 1714 | ROUTE 9<br>ROUTE 10<br>ROUTE 11 | DRIVER: D<br>PASSENGER: C<br>CHILD IN REAR SEAT: YES<br>TIME 8:15 AM | PREDICTION: ROUTE 10<br>SHOULD BE TAKEN,<br>PROVIDE NOTIFICATION<br>IF PASS CROSSROAD |

FIG. 17

SYSTEM FOR PROVIDING A NOTIFICATION OF A PRESENCE OF AN OCCUPANT IN A VEHICLE THROUGH HISTORICAL PATTERNS AND METHOD THEREOF

CROSS-REFERENCE TO RELATED APPLICATIONS

The present application claims priority to U.S. patent application Ser. No. 15/397,101 entitled "System for Providing a Notification of a Presence of an Occupant in a Vehicle Through Historical Patterns and Method Thereof," filed on Jan. 3, 2017, the content of which is incorporated by reference in its entirety.

BACKGROUND

Upon arrival at a destination, a pre-occupied parent may forget a child who is quietly sleeping in the backseat of a vehicle. Warning systems have been developed to notify drivers of children left in the vehicle. These systems may provide alerts to the parent through an audible notification from the vehicle. Other notifications may be provided through the vehicle's connection to the parent's smartphone. The warning systems may notify others including law enforcement.

Providing a warning to the parent after arriving at the destination has drawbacks. For example, the driver may have forgotten to drop their child off at daycare. The driver may then have to go back to daycare and drop the child off wasting valuable time. For predictable commutes information may not be properly leveraged by these systems, for example, a driver who drops off their children to school and going to work. The present disclosure provides a system and method thereof that addresses these concerns. Other benefits and advantages will become clear from the disclosure provided herein and those advantages provided are for illustration.

BRIEF DESCRIPTION

According to one exemplary embodiment, a computer-implemented method for providing a notification of a presence of an occupant in a vehicle is provided. The method may include identifying a first route taken with the occupant, identifying a second route taken without the occupant, determining a crossroad where the first route and second route separate into different directions, and providing the notification after the crossroad is passed by the vehicle if the second route is taken with the occupant.

According to another exemplary embodiment, a vehicle is provided. The vehicle may include a location system tracking routes traveled by the vehicle, a detection system determining whether an occupant is in the vehicle along those routes traveled by the vehicle, and a notification system storing the routes traveled by the vehicle with and without the occupant in the vehicle to provide a notification when a route is taken with the occupant and the route is not associated with the occupant based on historical patterns of the routes traveled by the vehicle with and without the occupant.

According to yet another exemplary embodiment, a vehicle computing system is provided. The vehicle computing system may include at least one processor and a memory operatively coupled to the processor, the memory storing program instructions that when executed by the processor, causes the processor to perform processes. The processes may include identifying a first route taken with an occupant, identifying a second route taken without the occupant, determining a crossroad where the first route and second route separate into different directions, and providing a notification after the crossroad is passed by the vehicle if the second route is taken with the occupant.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 16 is a schematic diagram of an illustrative historical pattern and prediction based on the historical pattern in accordance with one aspect of the present disclosure;

FIG. 17 is a schematic diagram of another illustrative historical pattern and prediction based on the historical pattern in accordance with one aspect of the present disclosure;

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

Generally described, the systems and methods disclosed herein are directed to providing a notification of a presence of an occupant in a vehicle before arriving at a destination. In an illustrative embodiment, the vehicle may include a location system for tracking routes taken or traveled by the vehicle. The vehicle may include a detection system for determining whether the occupant is in the vehicle along those routes traveled by the vehicle. The vehicle may also include a notification system. The notification system may store the routes traveled by the vehicle with and without the occupant in the vehicle. The notification system may provide a notification when a route is taken with the occupant and the route is not associated with the occupant based on the historical patterns of the routes traveled by the vehicle with and without the occupant.

Figure 1:
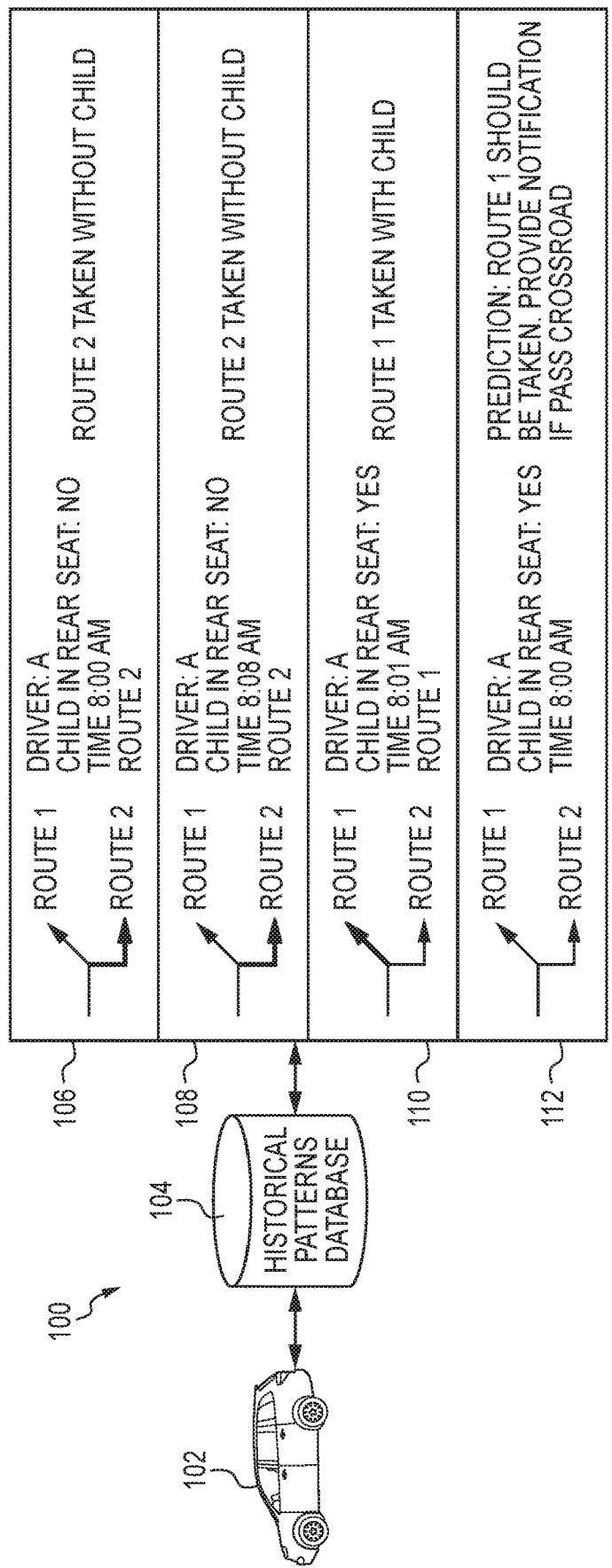
FIG. 1 is a schematic diagram of an illustrative environment for notifying a presence of an occupant in a vehicle through historical patterns in accordance with one aspect of the present disclosure.
Figure 2:
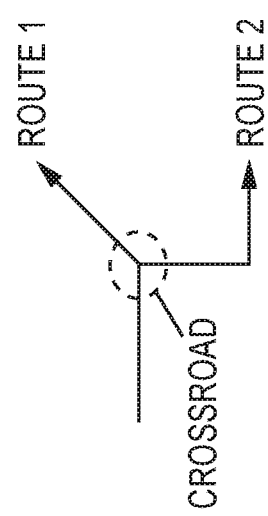
FIG. 2 is a schematic diagram of an exemplary map providing a crossroad after which notification may be given in accordance with one aspect of the present disclosure.
Figure 3:
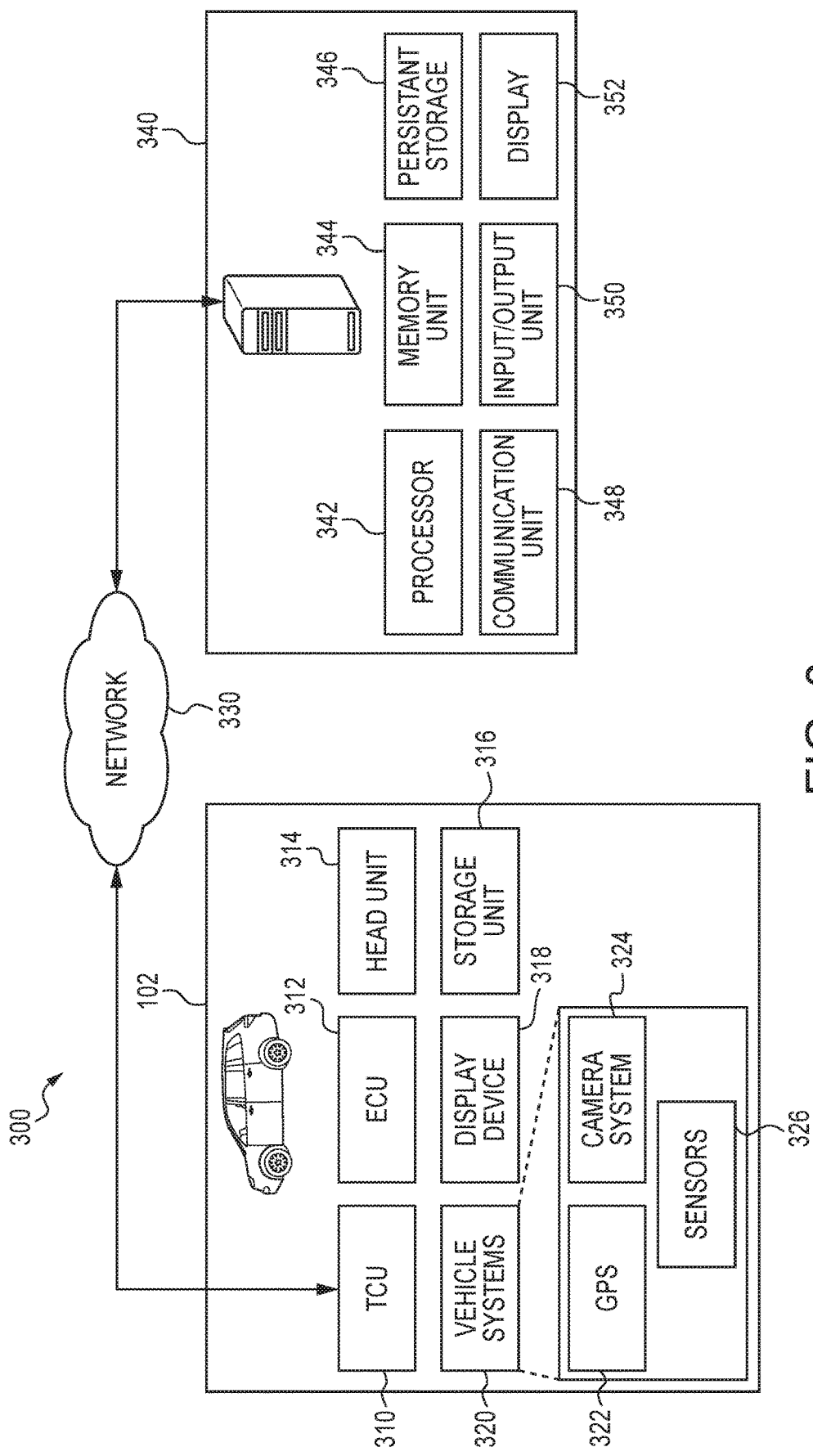
FIG. 3 is a schematic diagram of an illustrative vehicle linking system for offboard processing of historical patterns in accordance with one aspect of the present disclosure.
Figure 4:
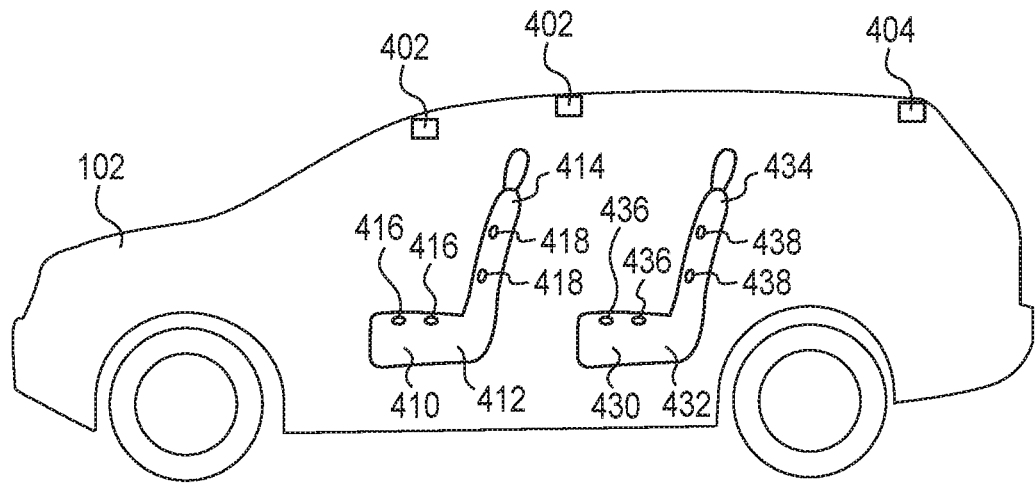
FIG. 4 is a schematic diagram of an illustrative vehicle showing cameras and sensors for detecting drivers, passengers and/or occupants in accordance with one aspect of the present disclosure.
Figure 5:
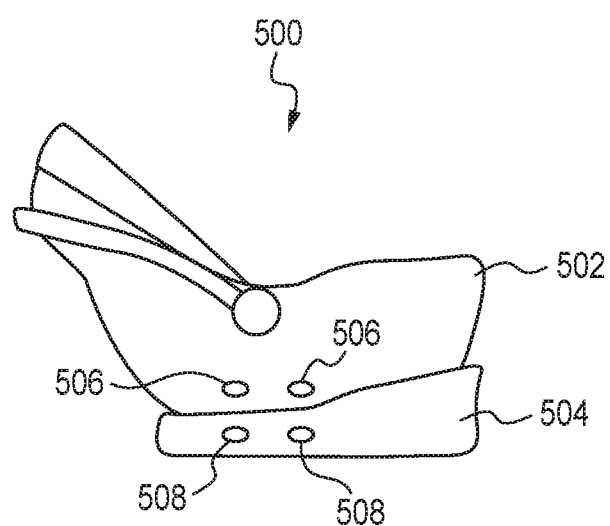
FIG. 5 is a schematic diagram of an illustrative carrier showing sensors for detecting an occupant in accordance with one aspect of the present disclosure.
Figure 18:
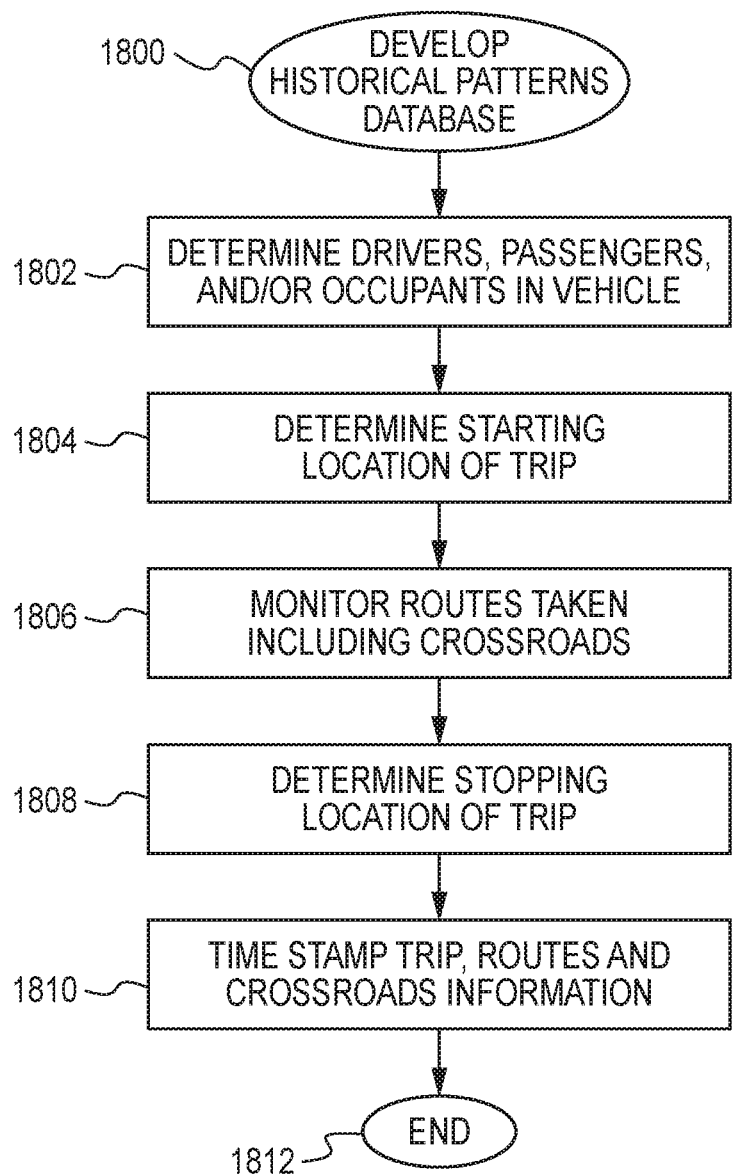
FIG. 18 is an illustrative process flow diagram for developing an exemplary historical patterns database in accordance with one aspect of the present disclosure.
Figure 19:
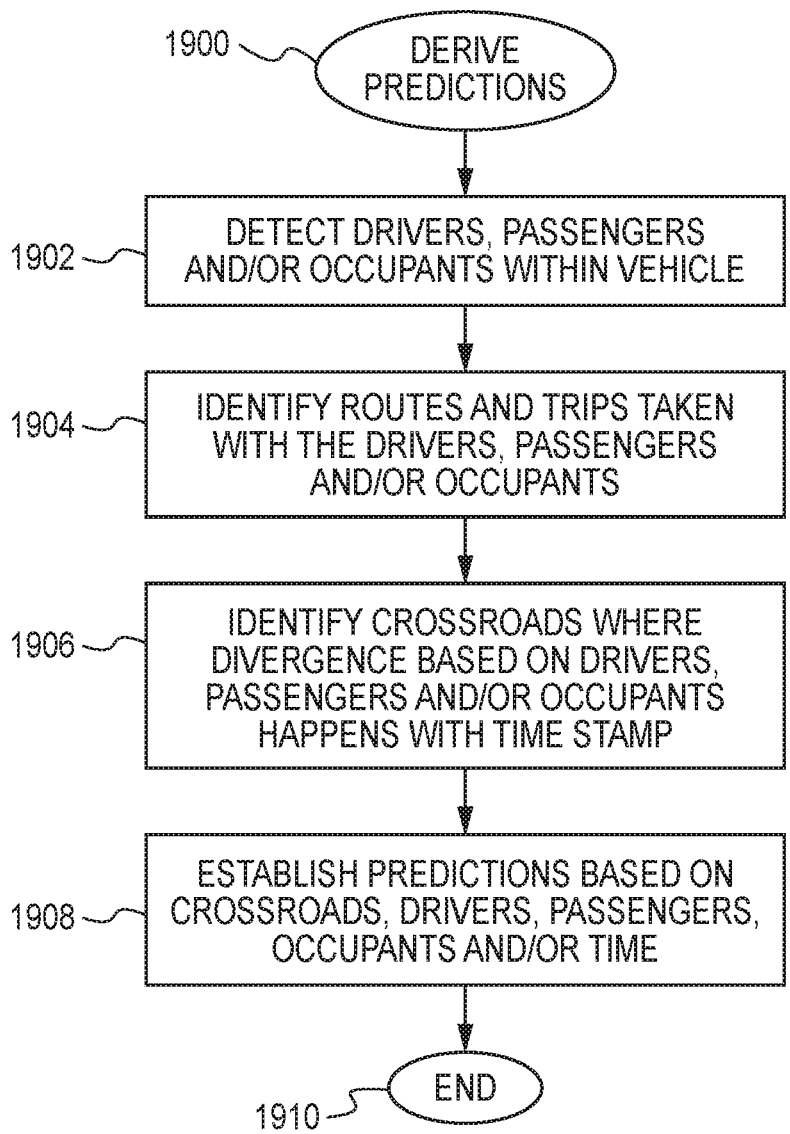
FIG. 19 is an illustrative process flow diagram for deriving exemplary predictions in accordance with one aspect of the present disclosure.
Figure 20:
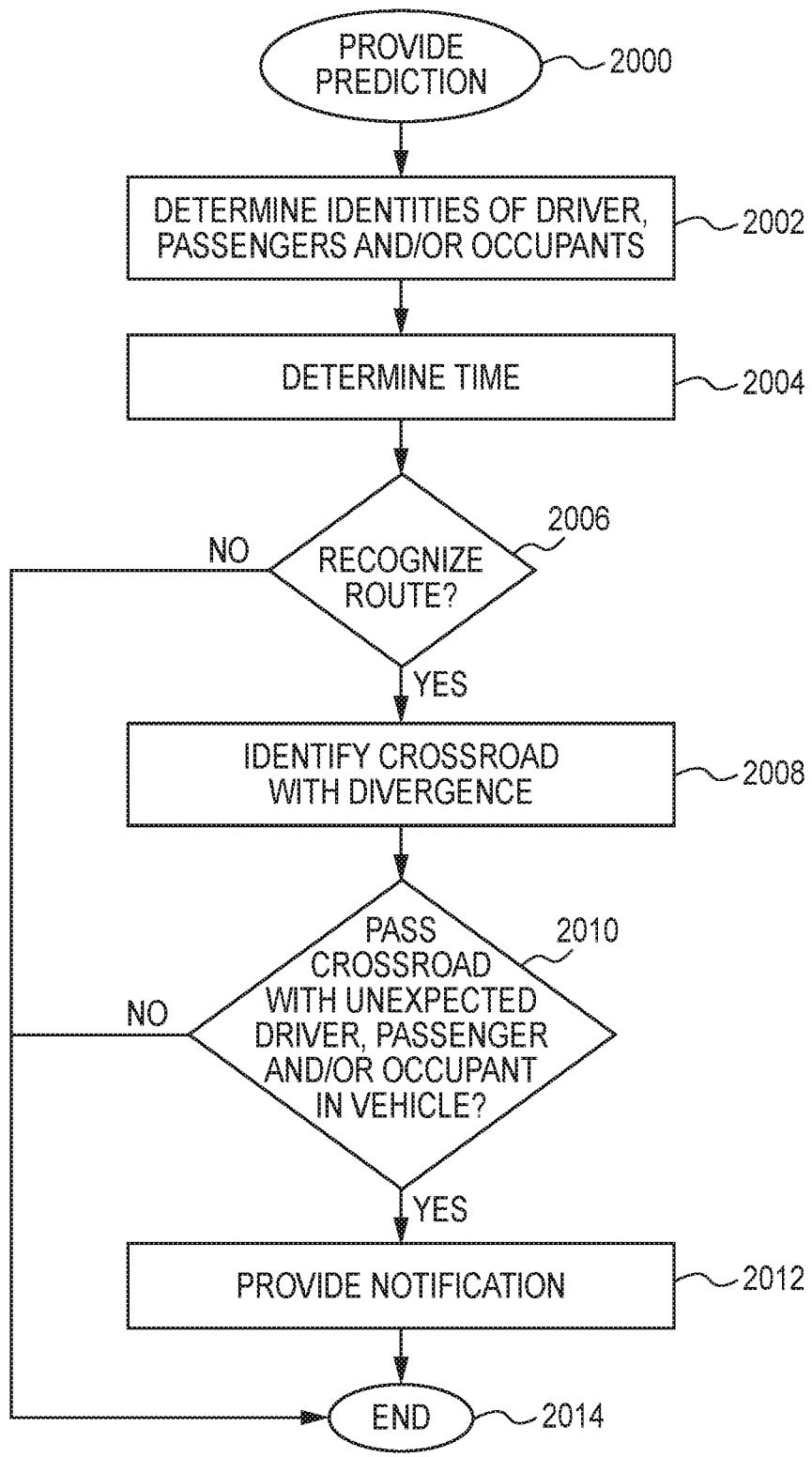
FIG. 20 is an illustrative process flow diagram for providing exemplary predictions in accordance with one aspect of the present disclosure.

Numerous other modifications or configurations to the system and method thereof will become apparent from the description provided below. For example, different notifications provided for various occupants are disclosed. By using the historical patterns, these notifications may be provided well in advance of arriving at the destination. Other advantages will become apparent from the description provided below. FIGS. 1 and 2 show one example of using historical patterns to notify a presence of an occupant. FIG. 3 provides an exemplary environment for providing the notification to the vehicle. FIGS. 4 and 5 show illustrative sensors for detecting occupants within the vehicle. FIGS. 6 through 15 depict occupants within the vehicle and maps leading to different warnings while FIGS. 16 and 17 show other historical patterns for providing notifications. FIGS. 18 through 20 show flowcharts for providing notifications of the presence of the occupant.

Turning now to FIG. 1, a schematic diagram of an illustrative environment 100 for notifying a presence of an occupant in a vehicle 102 through historical patterns 106, 108 and 110 in accordance with one aspect of the present disclosure is provided. An occupant may refer to a person, animal, or the like who is the backseat of the vehicle 102. For example, an occupant may be a child who may require assistance getting out of the vehicle 102. Passengers may refer to persons within the vehicle 102 other than the driver and occupants, who are typically seated in the front seat of the vehicle 102.

In the example provided within the environment 100, historical patterns 106, 108 and 110 may be stored within a database 104. The database 104 may be retained on the vehicle 102 or remote from the vehicle 102. Location information, including a route taken by the vehicle 102, may be stored along with whether or not an occupant is within the vehicle 102. Time stamps may be placed with this information. These time stamps may include clock and/or calendar information. For example, and as shown in the historical patterns 106, 108 and 110, the time may be noted with each. The day may also be provided, for example, weather the historical pattern was taken on a weekend or weekday. The month may also be noted with the historical patterns 106, 108 and 110.

In one historical pattern 106, Driver A has taken Route 2 at 8:00 AM with no child, or occupant, in the vehicle 102. This information may be logged into the database 104. As shown in FIG. 1, this may be provided in a table. In one embodiment, this may be established in a data structure specialized for storing this information. The data structure may be denoted through a class structure which is a typical programming technique.

In another historical pattern 108, the same driver, Driver A, has again taken Route 2 at 8:08 AM without a child. This information may also be logged into the database 104. Information that may be deduced from historical patterns 106 and 108 may include that Driver A generally travels alone around 8:00 AM and that Route 2 is taken without a child. This deduction may be made based on pattern recognition, for example, based on the number of times this route is taken, during this time of day, may lead to this deduction. In another example, the deductions may be made based on using a percentage of the times this route is taken. If the percentage is above a predetermined threshold, such as this route is taken ninety percent of the time, then this deduction may also be made. In one embodiment, this deduction may be displayed to the user of the system and the user may confirm whether or not this deduction is correct through a typical head unit or telematics system.

In historical pattern 110, Driver A has left at 8:01 AM with a child. Instead of taking Route 2, as the driver has done in the past without the child, Driver A now has taken Route 1. Further historical patterns may be stored within the database 104 and as each route is traveled, the confidence level of the system may be increased. For example, the confidence level may be increased based on the number of times the driver has taken the route. If a driver takes a route nine out of ten times, a higher degree of confidence may be made that this route should be traveled. Still yet, if the route has been traveled ninety-nine out of a hundred times, this confidence level is increased.

By using the historical patterns 106, 108 and 110, predictions may be made. For example, Route 1 is typically used around 8:00 AM if Driver A has a child with them otherwise Route 2 may be used when no child is present in the vehicle 102. These observations or predictions may be specific to Driver A. Other variations may exist, for example, the different times of the day may result in different routes taken with or without the child. Different days of the week may be accounted for when making a prediction on which route the driver may take. Further variations will be provided in detail below.

A prediction 112 may be made from the historical patterns 106, 108 and 110 that were described above. In the past, for example, Route 1 was taken when a child was present in the vehicle 102 around 8:00 AM and Driver A was driving. Route 2 was taken when Driver A was in the vehicle 102 but no child was present. The prediction 112 may note that when Driver A leaves around 8:00 AM with a child, Route 1 should be taken. A notification, or warning, may be provided if Route 2 is taken and Driver A has a child in the vehicle 102. This may indicate that Driver A has forgotten that the child is present in the vehicle as Driver A typically would have used Route 1 with the child. The notification may allow Driver A to be redirected to another destination, for example, Driver A has to drop off the child to daycare. Audible notifications or rerouting directions may be given.

Predictions may be based on the number of times a route is taken with or without the occupant. For example, if Driver A takes Route 2 a ninety percent of the time without a child then a reasonably accurate prediction may be made. This predetermined threshold, ninety percent, may be arbitrary and may be changed. In one embodiment, a prediction may not be made until a higher threshold is passed, such as Driver A takes Route 2 ninety-nine percent (99%) of the time without a child.

As an illustrative example of a prediction method, as the historical patterns are stored within the historical patterns database 104, counters or trackers may be used to denote each time a route is taken. Once a predetermined threshold of patterns has been reached, for example one hundred, then the predictions may be made as described above. That is, based on the number of times a particular route is taken, the predictions may be made. In one embodiment, routes that may have been taken, but have been designated as no longer being used, may be removed from deriving predictions. For example, if a route was predicted to be used a month ago, but has not been used in the last month, then those historical patterns associated with the prediction. In one embodiment, routes that are taken without children may not be kept track of or may be deleted out of the database 104.

Other factors may be considered when making predictions, for example, traffic and/or weather. In many instances, weather may alter the route. For example, when rain is present, predictions may be adjusted for Driver A to take alternative routes. Rain may be determined using a camera on the vehicle 102. The camera may be used to detect rain droplets on the windshield. A backup camera may also be used to detect rain droplets. Weather may also be detected using third party services and global positioning systems. By detecting the location of the vehicle, these third party services may know what the weather is like in the area. Other types of systems may be used to determine the weather in the vicinity of the vehicle 102.

Predictions may be cancelled and/or this data may not be used for historical purposes when certain weather conditions exist. In one embodiment, different weather patterns may lead to different routes and predictions may be made based on similar weather patterns and routes taken with or without the child. For example, historical routes may be grouped together based on when it is raining and when it is not. Other routes may be grouped together based on similar weather conditions, such as, fog, snow, etc.

In embodiments of the present disclosure, which will be shown in more detail below, the warning may be provided after a crossroad is passed by the vehicle 102. FIG. 2 is a schematic diagram of an exemplary map providing a crossroad after which a notification may be given in accordance with one aspect of the present disclosure. The crossroad may be defined by a separation of Route 1 and Route 2 into different directions with/without passengers, with/without occupants and depending on the driver driving. In other words, the location where Route 1 and Route 2 diverge may define the crossroad. During compiling of the historical patterns, there are common routes that no crossroads exist such that it may be indistinguishable with the driver, passengers and/or occupants within the vehicle 102.

Continuing with Driver A, in the illustration described above, either Route 1 or Route 2 may be taken by Driver A as the vehicle 102 approaches the crossroad. The system may or may not be able to predict before the crossroad is passed whether a notification should be provided as the incoming route to Route 1 and Route 2 is indistinguishable on whether an occupant would be in the vehicle 102. However, at the crossroad, where Route 1 and Route 2 intersect, a determination of whether Driver A has a child or does not have a child may be made with Route 1 being typically associated with a child in the back of the vehicle 102 and Route 2 not having a child in the vehicle 102. The crossroad may be the intersection, for example, between Driver A's work and daycare for the child.

The notification or warning may be provided after passing the crossroad. In one embodiment, the notification may be directions provided on a head unit of the vehicle 102. Driver A may have gone a distance down on Route 2 with the child and may be given redirection to Route 1, for example, to drop the child off at daycare. Other notifications may include audio rerouting instructions to Driver A. Audible warnings, such as beeping or music, may be provided to Driver A once the crossroad has been passed. By providing these types of notifications, Driver A may be notified in advance prior to arriving at their destination.

In one embodiment, the notification or warning may be provided before passing the crossroad. For example, and continuing with illustration above, Driver A may be given a notification that Route 1 should be taken before the crossroad, i.e., before the crossroad is passed. A notification may be given at a predetermined distance before the crossroad if the child has been detected. Stronger notifications may be given as Driver A approaches the crossroad such that Driver A is on constant alert. Alternatively, one notification may be given. A combination of notifications may also be given such that a certain type of notification is given before the crossroad and another different notification is given after Driver A passes the crossroad on Route 2 with the child. In one embodiment, a notification may be given after the vehicle has parked or stopped. In another embodiment, the notification may be removed after a correction is made, i.e., after returning to the correct route.

While Route 1 and Route 2 were shown at the crossroad, other configurations may exist and are not limited to those shown above. For example, three or more routes may intersect at a crossroad with each route representing a different path that a driver may take depending on passengers and occupants within the vehicle 102. In one instance a first route may be taken when the driver has a first child in the backseat, a second route may be taken when the driver has two children in the backseat, and a third route may be traveled when no children are present in the vehicle 102. Using each of these historical patterns, predictions may be made when children are present or not within the vehicle 102. A notification, or warning, may be provided when a route taken by the driver is not consistent with a prediction.

The complexity of the predictions may increase depending on the driver, passengers and/or occupants within the vehicle 102. In one example, Driver A may take a different path from Driver B. In one embodiment, different passengers and/or occupants within the vehicle 102 may also be determinative of which routes may be taken. For example, if Driver A is now with a passenger in the front, different routes may be taken with and without children in the backseat. Different predictions may be made with the passenger now within the vehicle 102. In one illustrative example, the passenger may be dropped off before the children. Continuing with the example above, Route 2 may be taken without giving a warning if there are children in the vehicle 102 such that the driver may drop off the passenger. If wholly new routes are taken after the notification is provide, and the routes are continuously taken thereafter in following trips, then new patterns may be stored within the historical patterns database 104 and new predictions may be made. More examples will be provided below and the scenario described above was for illustrative purposes.

FIG. 3 is a schematic diagram of an illustrative vehicle linking system 300 for offboard processing of historical patterns in accordance with one aspect of the present disclosure. While the processing may take place entirely on the vehicle 102, it may also take place offboard. In one embodiment, a combination of onboard and offboard processing may be used to provide predictions along with notifications. The system 300 may include the vehicle 102, as described before, and a server 340 connected to the vehicle 102 through a network 330.

The vehicle 102 may generally include a telematics communication unit 310 (TCU), an electronic control unit 312 (ECU), a head unit 314, a storage unit 316, a display device 318 and a plurality of vehicle systems 320. The TCU 310 of the vehicle 102 may be an external interface for mobile communication that facilitates the sending and receiving of data between the vehicle 102 and the externally hosted server 340. The TCU 310 may also be connected to the ECU 312 and is capable of providing wired or wireless computer communications utilizing various protocols to be applied to send/receive electronic signals internally to the head unit 314, and the plurality of vehicle systems 320, among other components within the vehicle 102 and to external devices.

In one embodiment, the TCU 310 may be an external interface for mobile communication between the vehicle 102 and the externally hosted server 340 through an internet cloud. More specifically, the TCU 310 may utilize a global system for mobile communications (GSM), general packet radio service (GPRS), Wi-Fi®, WiMax®, Bluetooth®, or LTE® wireless connection to send and receive one or more data signals to and from the externally hosted server 340 directly through the internet cloud.

In one or more embodiments, the ECU 312 may include internal processing memory, an interface circuit, and bus lines (all not shown) for transferring data, sending commands, and communicating with the other vehicle components. Generally, the ECU 312 includes a processor and memory (not shown). In some embodiments, the ECU 312 also includes a communications device (not shown) for sending data internally in the vehicle 102 and externally to connected devices. The communication device included within the ECU 312 is capable of providing wired or wireless computer communications utilizing various protocols to send/receive electronic signals internally to the vehicle components.

In an exemplary embodiment, the head unit 314 of the vehicle 102 may be utilized to execute one or more applications that may store the routes taken by the vehicle 102 and make predictions. In one embodiment, the head unit 314 may be operably controlled by the ECU 312 to provide output of one or more of the plurality of vehicle systems 320. In an alternate embodiment, the head unit 314 may include a separate controller (not shown) that may be used to control operation of the head unit 314 through a microprocessor (not shown).

With respect to the storage unit 316, in addition to storing the one or more applications, the storage unit 316 may store one or more operating systems associated operating system data, application data, vehicle system and subsystem user interface data, and the like that are executed by the ECU 312 through the head unit 314. The storage unit 316 may also include vehicle data related to the identity and use of the vehicle 102 and/or the identity of the driver of the vehicle 102 that may include, but is not limited to the VIN of the vehicle 102, make and model information of the vehicle 102, a data log (not shown) of the vehicle 102, vehicle settings data, vehicle driver data, and the like. In one embodiment, the data log of the vehicle 102 may include various types of data that are logged by the ECU 312, the head unit 314, the plurality of vehicle systems 320, among additional vehicle components. In one or more embodiments, the vehicle data may be associated with vehicle settings data that are associated to a specific driver of the vehicle 102. Route information along with time and dates taken may be stored within the storage unit 316. This information may be combined with data from vehicle sensors 326, described below, with respect to occupancy determinations including whether which driver, passenger and/or occupants are within the vehicle 102.

In one or more embodiments, the head unit 314 may also include a communication device (not shown) that may be operably connected for internal computer communications to the display device 318, the TCU 310, in addition to additional components of the vehicle 102. The communication device may send and receive data signals to the TCU 310. In one embodiment, the display device 318 may provide a human machine interface (HMI) to provide a driver(s), passenger(s) and occupant(s) of the vehicle 102 with various types of information. The display device 318 may include a display screen (not shown) that may be a flat panel display. In some embodiments, the display screen of the display device 318 may be a touch screen that may be used to provide touch inputs to user interfaces provided via the head unit 314.

The plurality of vehicle systems 320 may include a GPS 322, a vehicle camera system 324 and a plurality of vehicle sensors 326. The GPS 322 may operably connect to a navigation system (not shown) in the vehicle 102. Routes may be tracked through the GPS 322 through this type of location system. These routes, as described above, may be stored within the storage unit 316. In one embodiment, this information may be included in table format similar to those shown in FIG. 1, i.e., historical routes 106, 108 and 110. The GPS 322 may continuously update the route that is taken storing this information with the storage unit 316. Older routes, dependent on time and/or the capacity of the storage unit 316, may be removed.

Additionally, the vehicle camera system 324 may include one or more cameras (not shown) that are positioned at various locations within and/or outside of the vehicle 102. The one or more cameras may capture images within and/or outside of the vehicle 102 including images of a specific driver of the vehicle 102. The camera system 324 may also determine passenger and occupants in the vehicle. In one embodiment, the system 324 may be simple determining the fact that there is a driver, passenger and/or occupant. Alternatively, more details may be provided by the camera system 324 identifying the particular person or party entering the vehicle 102.

In one or more embodiments, the plurality of vehicle sensors 326 may generally include contact sensors and/or non-contact sensors that are positioned at various locations within and/or outside of the vehicle 102. The plurality of vehicle sensors 326 may include electric current/potential (e.g., proximity sensors, inductive, capacitive), ultrasonic (e.g., piezoelectric, electrostatic), vibration, optical, vision, photoelectric or oxygen sensors, among others. In an exemplary embodiment the plurality of vehicle sensors 326 may include sensors that are operable to sense a measurement of data associated with the specific driver of the vehicle 102, the vehicle 102, a vehicle environment, the plurality of vehicle systems 320, and/or one or more drivers, passengers and/or occupants of the vehicle 102, and may output one or more data signals indicating one or more measurements of data to the ECU 312. The sensors 326 may detect drivers, passengers and/or occupants through either of the described mechanisms above.

The plurality of vehicle systems 320 may also generally include, but are not limited to, (additional vehicle systems not shown) a vehicle HVAC system, a vehicle infotainment system, a vehicle engine control system, a vehicle transmission control system, vehicle safety control systems, vehicle stability control systems, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a brake pedal system, an electronic power steering system, a proximity sensor systems, and an electronic pretensioning system, among others.

The communications network 330 may include or take the form of one or more wired and/or wireless networks. The network 330 may include one or more wide area networks such as the Internet or a portion thereof, one or more cellular networks, one or more telephone networks, various intermediate networking devices and edge devices such as wireless and/or wired access points, etc. Wireless access points may support the same or different wireless communications protocols. As one example, wireless access points may each support communications over wide-area cellular network protocols. As another example, wireless access point may support communications over a local-area network using the Wi-Fi protocol, while wireless access point may support communications over a wide-area cellular network.

Wireless communications between two or more devices within the vehicle linking system 300 may take the form of short-range wireless communications link utilizing near-field communications or a personal area network via an RFID protocol, the Bluetooth® wireless communication protocol, the Wi-Fi wireless communication protocol or other suitable wireless communication protocol. In addition, wireless communications between the components of the environment may be provided over a local area network and/or a wide area network using other suitable protocols and may traverse one or more intermediate networking devices and/or access points. For example, wireless links may utilize GSM, 3G UMTS/3GPP and/or 4G LTE/3GPP cellular protocols, Wi-Fi 802.11 protocols as defined by IEEE, Wi-Max 802.16 protocols as defined by IEEE or other suitable wireless communication protocols. For example, communication flows in association with the communications network 330 may take the form of relatively long-range wireless communications using one or more of these wireless communication protocols.

Continuing with FIG. 3, the server 340 may include a processor unit 342, memory unit 344, persistent storage 346, communications unit 348, input/output unit 350 and display 352. The TCU 310 of the vehicle 102 may communicate with the communication unit 348 of the server 340. Each component may interact with one another through a system bus. Fewer or more components may be included within the server 340. Computer programs may be typically stored in the persistent storage 346 until they are ready for execution, at which time the programs are brought into the memory unit 344 so that they can be directly accessed by the processor unit 342. The processor unit 342 may select a part of memory unit 344 to read and/or write by using an address that the processor 342 gives to the memory unit 344 along with a request to read and/or write. The reading and interpretation of an encoded instruction at an address causes the processor 342 to fetch a subsequent instruction, either at a subsequent address or some other address.

The communication unit 348 may be used to provide services locally or remotely. Locally, the server 340 may provide capabilities through its input/output unit 350 and display 352. Alternatively, the server 340 may be a host service where other devices may access it to process or derive information. The devices may access information from the persistent storage 346 through the server 340. On the server 340 programs may include retrieving route information. This may be retrieved in real time and be stored on the persistent storage 346. The persistent storage may include the historical patterns database 104. Information from the GPS 322 on the vehicle 102 may be provided to the server 340 through the network 330 and processed thereon. Timing information may be determined on the server 340 or the information may be provided through the vehicle 102.

In one embodiment, the information from the vehicle 102 from the vehicle systems 320 including the GPS 322, camera system 324 and the sensors 326 may be sent in real time or in the alternative, at periodic intervals. In one embodiment, when the vehicle 102 stops or parks, the information may be downloaded. In one embodiment, the information may be provided when connected to a WiFi connection.

Continuing with the sensors 326, and in accordance with one embodiment, FIG. 4 is a schematic diagram of an illustrative vehicle 102 showing sensors 326 and camera system 324 for detecting drivers, passengers and/or occupants in accordance with one aspect of the present disclosure. The sensors 326 are for illustrative purposes and fewer or more sensors may be used within the vehicle 102 to detect drivers, passengers and/or occupants. The sensors 326 may be used to detect particulars or alternatively, whether there is any party within the vehicle 102 but not the identity of the party.

In one embodiment, front cameras 402 of the camera system 324 may be used to detect occupants within the vehicle 102. The cameras 402 may be placed on a top front portion or middle of the vehicle 102 and angled downwards. The angle of the cameras 402 may be wide enough to cover a front driver and passenger along with occupants in the back of the vehicle 102. A back camera 404 may also similarly be used to detect drivers, passengers and occupants within the vehicle 102. The back camera 404, in one embodiment, may be more effective in capturing the occupants such that any rearward facing children may be detected. The back camera 404 may be angled downwards similar to the front cameras 402. In one embodiment, a combination of the front cameras 402 and back camera 404 may be used to detect the drivers, passengers and/or occupants within the vehicle 102. Other cameras may be used within the vehicle 102 and angled at different positions.

Vehicle sensors 326 within the seats 410 and 430 may also be used to detect occupancy within the vehicle 102. Sensors 416 in the bottom portion 412 of the front seat 410 may be provided. These sensors 416 may detect the weight of the occupant. When a threshold is met, the seat 410 may be determined to be occupied. In one embodiment, specific weight measurements may be used to determine the identity of the driver. The sensors 416 in the bottom portion 412 may measure for vibrations, pulse, sweat, etc. to determine whether the seat 410 is occupied.

Sensors 418 within the back portion 414 of the seat 410 may also be used to determine whether the seat 410 has been occupied. These sensors 418 may measure a pressure of the driver and/or passenger to determine whether the seat 410 in the vehicle 102 is occupied. While two different sets of sensors 416 and 418 for both the bottom portion 412 and back portion 414 of the seat 410 have been shown, the seat 410 may include additional sensors. Furthermore, other types of sensors 326, as discussed above, may be used. One or all of the sensors described above may be used and should not be construed as limiting for the purposes of detecting a driver, passenger and/or occupant.

The backseat 430 of the vehicle 102 may also include sensors 436 and 438. On a bottom portion 432 of the backseat 430, one or more sensors 436 may exist. These sensors 436 may also measure those characteristics described above including weight, vibrations, movements, sweat, etc, to determine whether the seat 430 has been occupied. Sensors 438 on the back portion 434 of the seat 430 may be provided in combination or alone to detect occupants on the backseat 430.

Fewer or more vehicle sensors 326 may exist in the vehicle 102 and are not limited to those shown above. Furthermore, some vehicles 102 may include fewer or more rows of seats where fewer or more sensors 326 may be used. In one embodiment, the system may be shut down when the backseat 430 has been folded down. Many types of sensors 326 may be provided to account for which seats 410 and 430 within the vehicle 102 are occupied. Some of them may be complex providing detailed information while others may provide less detail describing that the seats 410 and 430 have been occupied.

FIG. 5 is a schematic diagram of an illustrative carrier system 500 showing sensors 326 for detecting a child in accordance with one aspect of the present disclosure. The carrier system 500 may be wirelessly, or through a wireline, connected to the vehicle systems 320 of the vehicle 102. In one embodiment, the carrier system 500 may have a weight sensor that detects whether an occupant is within it. This information may be provided to the vehicle 102 through the vehicle systems 320. In the shown embodiment, a pair of sensors 506 may exist on the carrier 502. Alternatively, a pair of sensors 508 may be provided on the base 504 of the carrier system 500. These sensors 508 may detect the other pair of sensors 506 such that when they are detected, the occupant within the carrier system 500 may be detected. In other words, when the carrier 502 is on the base 504 an occupant may be detected. When the carrier 502 is in the base 504, the system may assume that a child is in the vehicle 102.

The shown embodiment provides one additional way of detecting an occupant in the backseat 430 of the vehicle 102. Other vehicle systems 320 may include seatbelt detectors, such that when the seat belt has been properly secured, an occupant determination may be made. Other occupant detection systems may include wearables that may be tied to the occupants. These wearables may be tied to the vehicle systems 320 so that the occupant may be detected when in the vehicle 102. These wearables may be tied to the systems 320 through a wireless connection.

Beforehand, a single driver, Driver A, with a single occupant was described within the vehicle 102. Route 1 and Route 2 were traversed with and without the child. Using historical patterns 106, 108 and 110, the prediction 112 was made. A number of different scenarios will now be described with various drivers, passengers and/or occupants. Predictable commutes may lead to predictions and if those predictions are not followed, warnings may be given.

Figure 6:
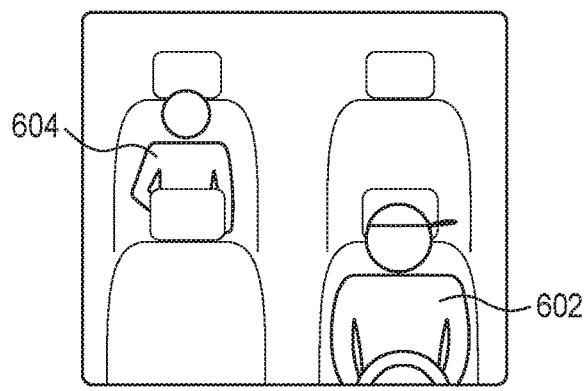
FIG. 6 is a schematic diagram of an illustrative interior of a vehicle showing a single child and single driver in accordance with one aspect of the present disclosure.

Referring to FIG. 6, a schematic diagram of an illustrative interior of a vehicle 102 showing a single child 604 and single driver 602 in accordance with one aspect of the present disclosure is provided. In the illustration provided above, the driver 602 may be Driver A and the child 604 may be the occupant within the backseat 430. The system may easily distinguish a path that is taken with a child (Route 1) and without a child (Route 2). A prediction may be made as to which routes should be with a child and which should not be. If the prediction is off, for example, a route that is normally not taken with the child, but a child is currently with the driver 602 in the vehicle 102, then the warning may be provided.

Figure 7:
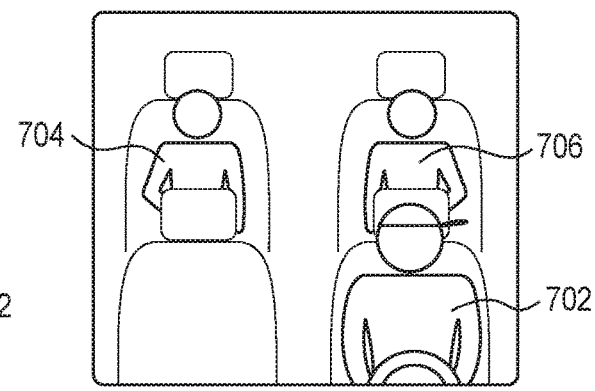
FIG. 7 is a schematic diagram of an illustrative interior of a vehicle showing two children and single driver in accordance with one aspect of the present disclosure.

In another example, FIG. 7 is a schematic diagram of an illustrative interior of a vehicle showing two children 704 and 706 and a single driver 702 in accordance with one aspect of the present disclosure. When the two children 704 and 706 are detected, different routes may be taken than those previously taken. For example, the driver 702 may need to drop at a first location the first child 704 and then at a second location the second child 706. Historical patterns may be stored in the database 104 and predictions may be made from there.

Figure 8:
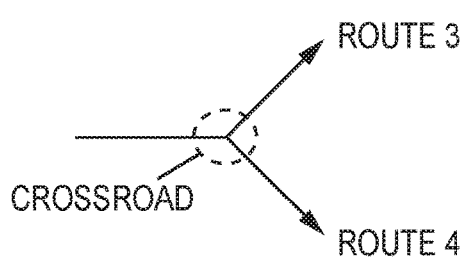
FIG. 8 is a schematic diagram of an exemplary map providing a crossroad after which notification may be given in accordance with one aspect of the present disclosure.

As shown in FIG. 8, Route 3 may be normally taken with the two children 704 and 706. Without the children 704 and 706, Route 4 may be taken by the driver 702. After many iterations of taking Route 3 with the children 704 and 706 and Route 4 without the children 704 and 706, predictions may be made. In one embodiment, the prediction may associate Route 4 without children and Route 3 with the children 704 and 706. If the driver takes Route 4 with the children 704 and 706 and the crossroad has been passed then a notification, or warning, may be provided to the driver 602.

Figure 9:
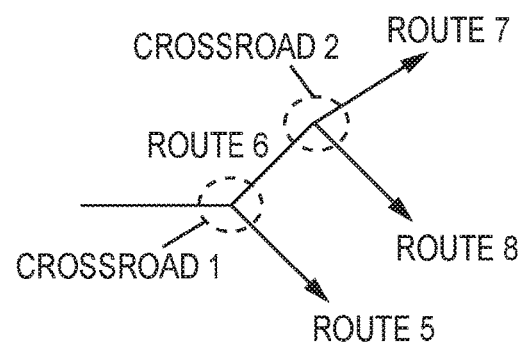
FIG. 9 is a schematic diagram of another exemplary map providing crossroads after which notification may be given in accordance with one aspect of the present disclosure.

In one embodiment, as shown in FIG. 9, a different notification system may be made dependent on multiple crossroads and multiple children 704 and 706 in the vehicle 102. Historical patterns may be stored within the database 104. In one illustration, Route 5 and Route 6 may define Crossroad 1. Historically, the driver 702 has taken Route 5 when no children are present. Route 6 has been taken when the children 704 and 706 are in the vehicle 102. In this scenario, however, the driver 702 has to drop off the children 704 and 706 at different locations, the first child 704 at daycare and the second child 706 at their grandmother's house. Routes 7 and 8 may define Crossroad 2. Route 7 may typically be associated with one child, while route 8 may be associated with both children.

Through a number of traversals of Routes 5, 6, 7 and 8 with and without the children 704 and 706, predictions may be made. If Route 5 is taken, then none of the children 704 and 706 should be present. If Route 5 is taken and Crossroad 1 is passed with any of the children 704 and/or 706, then a notification may be provided. Continuing, and when the children 704 and/or 706 are present, a prediction may be made that Route 7 should have only one child. If two children have been detected and Route 7 is taken and Crossroad 2 is passed then a warning may be provided. Other variations may exist and are within the scope of the present disclosure. The scenario present above is for illustrative purposes and should not be construed as limiting.

Figure 10:
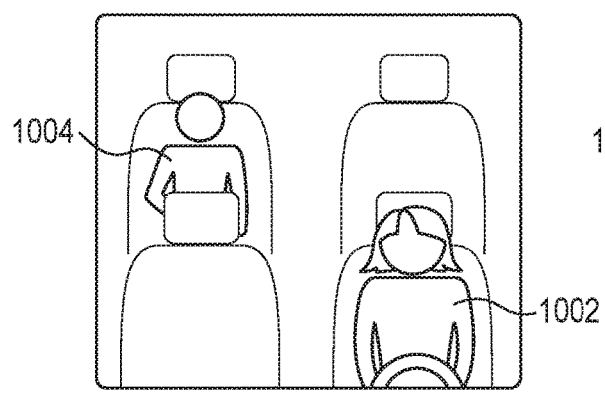
FIG. 10 is a schematic diagram of an illustrative interior of a vehicle showing a single child and another driver in accordance with one aspect of the present disclosure.

FIG. 10 is a schematic diagram of an illustrative interior of a vehicle 102 showing a single child 1004 and another driver 1002 in accordance with one aspect of the present disclosure. This scenario takes into account different drivers, whom may have different routes for driving as one driver may like to take a turn at a preferential crossroad. The identification of the driver 1002 may be determined through those camera system 324 and sensors 326 provided above. In the scenario provided above, as shown in FIG. 2, this driver 1002 may prefer to take Route 2 further down with the child 1004. A crossroad further down may be determined where the driver 1002 branches with and without the child. A prediction may be made and if that prediction is otherwise not followed, a notification may be provided. In one embodiment, different drivers may use the same predictive information. Patterns for different drivers may be used for making predictions.

Figure 11:
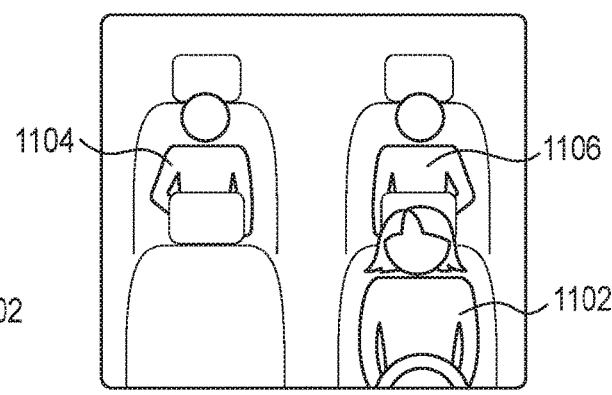
FIG. 11 is a schematic diagram of an illustrative interior of a vehicle showing two children and another driver in accordance with one aspect of the present disclosure.

FIG. 11 is a schematic diagram of an illustrative interior of a vehicle 102 showing two children 1104 and 1106 and another driver 1102 in accordance with one aspect of the present disclosure. Similar to before with two children, different routes may be taken within this particular driver 1102. Different routes may be taken further down and at different crossroads. From this information, including routes taken with and without the children 1104 and 1106, predictions may be made. If a route is predicted to be without a child or different number of children or different children, then a notification may be provided to the driver 1102.

Figure 12:
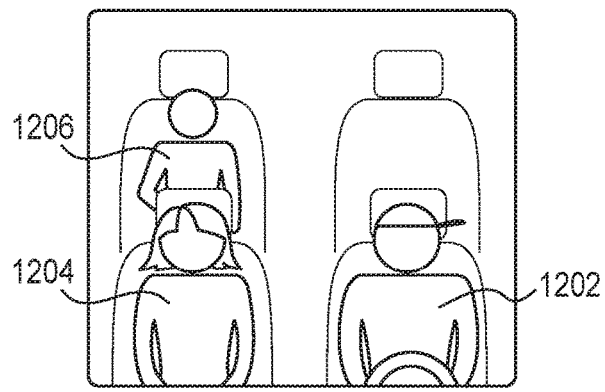
FIG. 12 is a schematic diagram of an illustrative interior of a vehicle showing a single child, a driver and a passenger in accordance with one aspect of the present disclosure.

FIG. 12 is a schematic diagram of an illustrative interior of a vehicle 102 showing a single child 1206, a driver 1202 and a passenger 1204 in accordance with one aspect of the present disclosure. In this scenario, and within the system, predictions may be made based on the passenger 1204 and who the driver 1202 is. Different routes may be taken. In this illustration, the passenger 1204 may be dropped off at another location such that Route 2, according to the original scenario, may be taken even though the child 1206 is in the vehicle 102 and the crossroad has been passed. In this case, the notification may be prevented from being warned when the passenger 1204 is in the vehicle.

In one embodiment, because of conversations within the vehicle 102 between the passenger 1204 and the driver 1202, the child may be forgotten after the passenger 1204 has been dropped off. Predictions, beforehand, may be made based on historical patterns taken with the child and without the child. If the driver 1202 is on a route with the child 1206 that is not typically associated with having a child, then a notification is provided.

Figure 13:
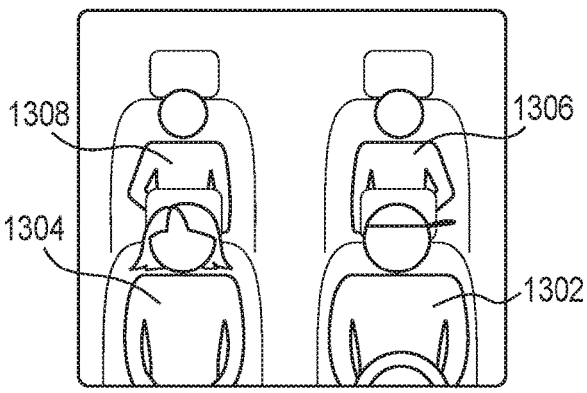
FIG. 13 is a schematic diagram of an illustrative interior of a vehicle showing two children, a driver and a passenger in accordance with one aspect of the present disclosure.

FIG. 13 is a schematic diagram of an illustrative interior of a vehicle showing two children 1306 and 1308, a driver 1302 and a passenger 1304 in accordance with one aspect of the present disclosure. In this scenario, the children 1306 and 1308 may be associated with different routes. Predictions may be made and if they are not followed, notifications may be provided. In this case the passenger 1304 may be dropped off and the children 1306 and 1308 may be dropped off after that. Predictions may be made and then if those predictions do not occur, then a notification may be given.

Figure 14:
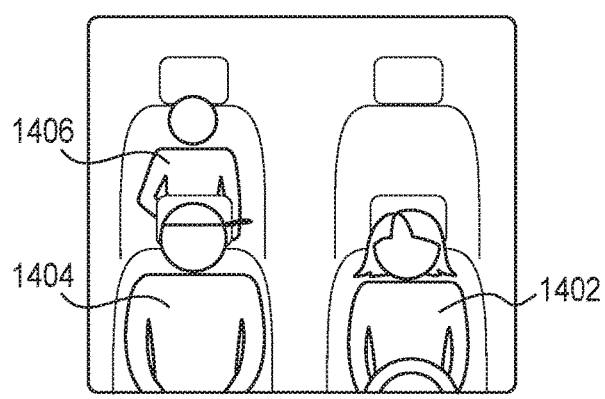
FIG. 14 is a schematic diagram of an illustrative interior of a vehicle showing a single child, another driver and another passenger in accordance with one aspect of the present disclosure.
Figure 15:
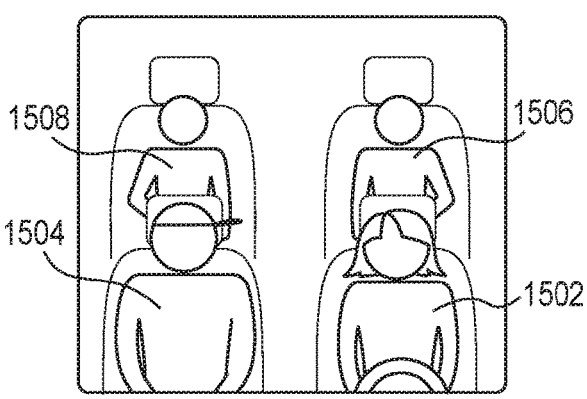
FIG. 15 is a schematic diagram of an illustrative interior of a vehicle showing a two children, another driver and another passenger in accordance with one aspect of the present disclosure.

FIG. 14 is a schematic diagram of an illustrative interior of a vehicle 102 showing a single child 1406, another driver 1402 and another passenger 1404 in accordance with one aspect of the present disclosure. This is a different configuration where another driver takes place and has different preferred routes. FIG. 15 is a schematic diagram of an illustrative interior of a vehicle 102 showing two children 1506 and 1508, another driver 1502 and another passenger 1504 in accordance with one aspect of the present disclosure. Different scenarios with different drivers and varying amounts of children result in multiple predictions along the routes. Notifications may be provided if those predictions are not followed.

FIG. 16 is a schematic diagram of illustrative historical patterns 1602, 1604 and 1606 and prediction 1608 based on the historical patterns 1602, 1604 and 1606 in accordance with one aspect of the present disclosure. The scenario presents different drivers having various routes. Driver B may take different routes from Driver A. In the past, Driver A would have taken Route 2 without the child and Route 1 with the child.

In one historical pattern 1602, Driver B has taken Route 2 at 8:50 AM with a child, or occupant, in the vehicle 102. This information may be logged into the database 104. In another historical pattern 1604, the same driver, Driver B, has taken Route 1 at 9:10 AM without a child. This information may also be logged into the database 104. In historical pattern 1606, Driver B at 8:46 AM has taken Route 2 with a child. Information that may be deduced from historical patterns 1602, 1604 and 1606 may include that Driver B generally travels on Route 1 alone around 9:00 AM and that Route 2 is taken with a child around that time.

From the historical patterns 1602, 1604 and 1606 deductions may be made by the vehicle 102, remotely on the server 340 and/or both. A prediction 1608 may be made when a child is detected within the seat through those vehicle systems 320 described above. The prediction 1608 based on the historical patterns 1602, 1604 and 1606 would indicate that Route 2 should be taken. However, if Route 2 is not taken and a crossroad is passed, then a notification may be provided.

FIG. 17 is a schematic diagram of other illustrative historical patterns 1702, 1704, 1706, 1708 and 1710 and predictions 1712 and 1714 based on the historical pattern 1702, 1704, 1706, 1708 and 1710 in accordance with one aspect of the present disclosure. This is one illustrative scenario but others may be contemplated and are within the scope of the present disclosure. As shown, Route 9, Route 10 and Route 11 may be provided and may be associated with different drivers, passengers and/or occupants in the vehicle 102.

In a historical pattern 1702, Driver C with Passenger D and children in the seat take or enter a crossroad that separates Routes 9, 10 and 11 at around 8:15 AM. With the child, Driver C takes Route 9 with the child. This information is logged into the historical patterns database 104. In another historical pattern 1704, the same driver, Driver C, with Passenger D and the child again take Route 9 around 8:10 AM. This information is logged into the historical patterns database 104.

In another historical pattern 1706, a new driver, Driver D with Passenger C may now be driving. A child may be detected in the rear seat and they may approach the crossroad around 8:16 AM. Driver D may prefer to take Route 10 instead of Route 9 with the child. This may be because Driver D is dropping off Passenger C at some location or Driver D simply prefers to take another route. This information may be located into the historical patterns database 104.

Continuing, a historical pattern 1708 may be taken where Route 11 is taken. For this time, no child is in the rear seat but Driver D and Passenger C are in the vehicle 102. This route may indicate that the route may be taken when there is no child in the vehicle 102. This information may be stored in the database 104. The time for this action may be 8:20 AM. For historical pattern 1710, Route 11 may be taken again without a child for Driver D and Passenger C. The time for this action may be 8:21 AM. This information may be logged into the database 104.

Using the historical patterns 1702, 1704, 1706, 1708 and 1710, deductions or predictions 1712 and 1714 may be made. In one prediction 1712, when Driver C, Passenger D and the child is in the vehicle 102 and enter at a crossroad at around 8:00 AM, a prediction may be made. The prediction 1712 may be made that Route 9 should be taken as in the past this route was taken with Driver C and Passenger D with a child or children. Notifications may be provided if either Route 11 or Route 12 are taken as they normally would not be taken.

Another prediction 1714 may be made with Driver D and Passenger C. At 8:15 AM, Driver D is approaching the crossroad created by Routes 9, 10 and 11. Driver D is different from Driver C and may prefer a certain route. This prediction may be made based on historical patterns that may be analyzed on the vehicle 102, server 340 or both. With a child in the rear seat the prediction 1714 may be that Route 10 should be taken. A notification may be provided if Route 9 or Route 11 is taken.

The predictions 1712 and 1714 shown are based off the historical patterns 1702, 1704, 1706, 1708 and 1710. The historical patterns 1702, 1704, 1706, 1708 and 1710 may indicate the general or typical route that the driver would take based on previous usage of those routes and occupancy detections. If the route is not followed and a different path is taken after a point (crossroad) then the warning is provided. A predetermined distance or time after the crossroad may be used to notify the driver. In one embodiment, the notification may be provided only once but would be discontinued after a predetermined time or distance away from the crossroad.

Referring to FIG. 18, an illustrative process flow diagram for developing an exemplary historical patterns database 104 in accordance with one aspect of the present disclosure is provided. Fewer or more processes may be used or developed for developing the historical patterns database 104. The processes may begin at block 1800. The processes may be executed on the vehicle 102, the server 340 and/or a combination thereof.

At block 1802, the vehicle 102 may determine the drivers, passengers and/or occupants within the vehicle 102. Different vehicle systems 320 may be used for this function. At block 1804, the system may determine the starting location of the driver's trip. This may be accomplished through the GPS 322. In one embodiment, the trip does not have to be entered into a navigation system. The system may determine that routes taken are regularly taken by the driver. Routes taken are monitored including crossroads at block 1806.

At block 1808, the system may determine the stopping location of the trip that was taken. The trips may be kept track of as well as which routes split off into crossroad with which drivers, passengers and/or occupants. At block 1810, time stamp information may be associated with the trip and the routes. This may include times at which crossroads were reached. Dates may also be associated with the information. The information may be stored in the historical patterns database 104. The processes may end at block 1812.

FIG. 19 is an illustrative process flow diagram for deriving exemplary predictions in accordance with one aspect of the present disclosure. Through the information stored in the historical patterns database 104 (which may occur on the vehicle 102, server 340 and/or combination), predictions may be made. This is just one set of processes to derive predictions and should not be construed as the only method. Fewer or more processes may be used to derive these predictions and should not be construed as limiting. The processes may begin at block 1900.

At block 1902, the system may detect the drivers, passengers and/or occupants in the vehicle 102. The detections may occur through the vehicle systems 320 presented above including the camera system 324 and sensors 326. Other sensors as described above may be used as well including weight sensors. The level of details of identifying the drivers, passengers and/or occupants may vary from a simple presence detection to a refined identification of the drivers, passengers and/or occupants. At block 1904, routes and trips that were taken with the drivers, passengers and/or occupants are identified.

At block 1906, the system may identify crossroads where divergence happens based on drivers, passengers and/or occupants. As described above, this may occur by determining routes taken with/without the passengers, with/without the occupants and the driver that is driving. Time stamps may be associated with multiple routes and crossroads. At block 1908, predictions may be established based on crossroads and drivers, passengers and/or occupants. For example, and as shown above, these predictions may be based on the number of times a route is taken. A percentage of times a route taken in the past may be used as a predictor. The processes may end at block 1910.

FIG. 20 is an illustrative process flow diagram for providing exemplary predictions in accordance with one aspect of the present disclosure. Fewer or more processes may be provided and those shown are for exemplary purposes. The processes may begin at block 2000. The predictions were calculated earlier based on received routing information from previous trips.

At block 2002, the system may determine the identities of the driver, passengers and/or occupants. This may occur at the beginning of a trip or during the trip. At block 2004, the time may be determined. The time may be important as during different periods of the day, week and/or year, the trip may change. At decision block 2006, the system determines whether the current route the driver is on is recognized based on previous historical patterns. The vehicle's location may be monitored by the GPS 322. When the route is not recognized, the processes may end at block 2014.

Otherwise, and when the route is recognized, the system may identify an upcoming crossroad where routes diverge at block 2008. The system may determine who is in the vehicle 102 and whether a predetermined crossroad is approaching based on the drivers, passengers and/or occupants. The crossroad is determined based on whether one or more of the drivers, passengers and/or occupants should be in the vehicle 102 in one route differentiated from another route as shown above.

At decision block 2010, the system determines whether the previously identified crossroad has been passed with an unexpected driver, passenger and/or occupant still in the vehicle 102. The predictions, described earlier, may be used to determine whether there is an unexpected driver, passenger and/or occupant. When there is no unexpected driver, passenger and/or occupant, the processes may end at block 2014. Otherwise, at block 2012, the system may provide a notification when an unexpected driver, passenger and/or occupant is in the vehicle 102. The processes may end at block 2014.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A computer-implemented method for providing a notification of a presence of an occupant in a vehicle, the method comprising:
   detecting, via at least one sensor, the occupant within the vehicle;
   identifying a first route taken with the occupant;
   identifying a second route taken without the occupant;
   determining a crossroad where the first route and second route separate into different directions; and
   providing the notification after the crossroad is passed by the vehicle when the second route is taken with the occupant.

2. The computer-implemented method of claim 1, further comprises identifying a driver of the vehicle before providing the notification.

3. The computer-implemented method of claim 1, further comprises identifying a passenger of the vehicle before providing the notification.

4. The computer-implemented method of claim 1, wherein identifying the first route taken with the occupant and identifying the second route taken without the occupant comprises gathering historical data on multiple routes taken with the occupant and without the occupant.

5. The computer-implemented method of claim 4, wherein gathering the historical data on the multiple routes taken with the occupant and without the occupant comprises determining a number of times that routes are taken with the occupant and a number of times that routes are taken without the occupant.

6. The computer-implemented method of claim 4, wherein gathering the historical data on the multiple routes taken with the occupant and without the occupant comprises determining a time when each of the multiple routes are taken.

7. The computer-implemented method of claim 1, wherein determining the crossroad where the first route and second route separate into different directions comprises identifying an intersection where the vehicle travels with the occupant and the vehicle travels without the occupant.

8. The computer-implemented method of claim 1, wherein detecting the occupant within the vehicle comprises detecting the occupant in a backseat of the vehicle.

9. The computer-implemented method of claim 1, wherein the at least one sensor includes at least one of a camera, a pressure sensor, a weight sensor, a vibration sensor, a pulse sensor, a sweat sensor, and a movement sensor.

10. The computer-implemented method of claim 1, wherein providing the notification after the crossroad if the second route is taken with the occupant comprises displaying rerouting directions for the vehicle.

11. A vehicle computing system of a vehicle comprising:
    at least one processor
    at least one sensor; and
    a memory operatively coupled to the processor and the at least one sensor, the memory storing program instructions that when executed by the processor, causes the processor to:
    detect, via the at least one sensor, an occupant in the vehicle;
    identify a first route taken with an occupant;
    identify a second route taken without the occupant;
    determine a crossroad where the first route and second route separate into different directions;
    provide a notification after the crossroad is passed by the vehicle when the second route is taken with the occupant.

12. The vehicle computing system of claim 11, wherein the memory stores program instructions when executed by the processor causes the processor to identify a driver of the vehicle before providing the notification.

13. The vehicle computing system of claim 11, wherein the memory stores program instructions when executed by the processor causes the processor to identify a passenger of the vehicle before providing the notification.

14. The vehicle computing system of claim 11, wherein the program instructions for identifying the first route taken with the occupant and identifying the second route taken without the occupant further comprises program instructions when executed by the processor causes the processor to gather historical data on multiple routes taken with the occupant and without the occupant.

15. The vehicle computing system of claim 14, wherein the program instructions for gathering the historical data on the multiple routes taken with the occupant and without the occupant further comprises program instructions when executed by the processor causes the processor to determine a number of times that routes are taken with the occupant and a number of times that routes are taken without the occupant.

16. The vehicle computing system of claim 14, wherein the program instructions for gathering the historical data on the multiple routes taken with the occupant and without the occupant further comprises program instructions when executed by the processor causes the processor to determine a time when each of the multiple routes are taken.

17. The vehicle computing system of claim 11, wherein the program instructions for determining the crossroad where the first route and second route separate into different directions further comprises program instructions when executed by the processor causes the processor to identify an intersection where the vehicle travels with the occupant and the vehicle travels without the occupant.

18. The vehicle computing system of claim 11, wherein the program instructions for detecting the occupant further comprises program instructions when executed by the processor causes the processor to detect the occupant in a backseat of the vehicle.

19. The vehicle computing system of claim 11, wherein the at least one sensors includes a camera, a pressure sensor, a weight sensor, a vibration sensor, a pulse sensor, a sweat sensor, or a movement sensor.

20. The vehicle computing system of claim 11, wherein the notification is a rerouting direction.

* * * * *